US010346329B2

(12) United States Patent
Casas, Jr. et al.

(10) Patent No.: US 10,346,329 B2
(45) Date of Patent: *Jul. 9, 2019

(54) TIMER PLACEMENT OPTIMIZATION

(71) Applicant: International Business Machines Corporation, Armonk, NY (US)

(72) Inventors: Juan M. Casas, Jr., Round Rock, TX (US); Nikhil Hegde, Austin, TX (US); Keerthi B. Kumar, Bangalore (IN); Shailaja Mallya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/791,859

(22) Filed: Oct. 24, 2017

(65) Prior Publication Data

US 2018/0276156 A1    Sep. 27, 2018

Related U.S. Application Data

(63) Continuation of application No. 15/465,704, filed on Mar. 22, 2017.

(51) Int. Cl.
*G06F 13/24* (2006.01)
*G06F 9/00* (2006.01)

(52) U.S. Cl.
CPC ............... *G06F 13/24* (2013.01); *G06F 9/00* (2013.01)

(58) Field of Classification Search
None
See application file for complete search history.

(56) References Cited

U.S. PATENT DOCUMENTS 5,297,275 A    3/1994  Thayer
6,937,603 B1*  8/2005  Miao ............... H04L 29/06027
                                              370/395.62
9,092,143 B1   7/2015  Bappe
(Continued)

FOREIGN PATENT DOCUMENTS

EP         2602964        6/2013

OTHER PUBLICATIONS

Adamczyk et al., Achieving High Resolution Timer Events in Virtualized Environment, Institute of Informatics, PLoS One 10(7), Jul. 15, 2015, pp. 1-25.
(Continued)

*Primary Examiner* — Hyun Nam
(74) *Attorney, Agent, or Firm* — Lieberman & Brandsdorfer, LLC

(57) ABSTRACT

A method is provided for optimized timer placement. A request to apply a new timer in a computer system is received and an interrupt time for the new timer is extracted from the new timer. A timer list is accessed for each processor in the system responsive to the received request. A range for placement of the new timer is established with respect to each of the accessed timer lists. A timer expiry delay is calculated between proximal processor interrupts and the extracted interrupt time based on the established range placement. Proximity of the extracted interrupt time within the existing processor interrupts is determined and one of the processors is selected based on the calculation and the determined proximity. The new timer is placed on the selected processor.

7 Claims, 7 Drawing Sheets

(56) References Cited

U.S. PATENT DOCUMENTS

| | | | | |
|---|---|---|---|---|
| 2011/0023040 A1* | 1/2011 | Hendry | ............... | G06F 9/3879 |
| | | | | 718/102 |
| 2011/0153822 A1* | 6/2011 | Rajan | ................... | G06F 9/5055 |
| | | | | 709/225 |
| 2012/0159221 A1* | 6/2012 | Guddeti | ............... | G06F 1/3228 |
| | | | | 713/323 |
| 2014/0052882 A1 | 2/2014 | Waters et al. | | |

OTHER PUBLICATIONS

Oikawa et al., Linux/RK: A Portable Resource Kernel in Linux, Real-Time and Multimedia Laboratory School of Computer Science, Proceedings of the IEEE Real-Time Systems Symposium Work-In-Progress. vol. 2. 1998, pp. 1-4.

Anonymous, Timers, Timer Resolution, and Development of Efficient Code, Microsoft Corporation, Jun. 16, 2010, pp. 1-11.

Takano et al., High-Resolution Timer-Based Packet Pacing Mechanism on the Linux Operation System, IEICE Transactions on Communications, vol. E94-B, No. 8, 2011, pp. 2199-2207, Abstract.

Sugaya et al., Accounting System: A Fine-grained CPU Resource Protection Mechanism for Embedded System, Proceedings of the Ninth IEEE International Symposium on Object and Component-Oriented Real-Time Distributed Computing, 2006, pp. 1-10.

Gleixner et al., Hrtimers and Beyond: Transforming the Linux Time Subsystems, Proceedings of the Linux Symposium, vol. 1, Jul. 19-22, 2006, pp. 333-346.

Goel et al., Supporting Time-Sensitive Applications on General-Purpose Operating Systems, CSETech, OHSU Digital Commons, Paper 53, Jan. 2002, pp. 1-14.

List of IBM Patents or Applications Treated as Related, Oct. 2017.

* cited by examiner

TIMER PLACEMENT OPTIMIZATION

This application is a continuation patent application claiming the benefit of the filing date of U.S. patent application Ser. No. 15/465,704 filed on Mar. 22, 2017 and titled "Timer Placement Optimization", now pending, the entire contents of which are hereby incorporated by reference.

BACKGROUND

The present embodiments relate to timer placement. More specifically, the embodiments relate to placement of application timers in a computer system.

Computer operating systems typically provide a mechanism which allows software to schedule an event to occur at some future time. This mechanism is referred to as a timer, which functions to interrupt a processor at one or more defined points in timer. A periodic interrupt is known as a system clock tick. In one embodiment, the operating system measures time in clock ticks that originates with system boot. The interrupt is a signal that prompts the operating system to stop work on one process and start work on another process.

In addition to the periodic interrupt, timers may be configured for non-periodic events. Applications often require the use of such non-periodic timers to track events such as database queries, application request, etc. These timers can be standard, e.g. low, or high resolution depending on real-time requirements of an associated application. The resolution, accuracy, or permissible error in the duration of the timer may vary with the task being performed. Often a higher degree of timer accuracy is desired. An example that requires a high resolution timer is computer animation sequencing. The animation may be playing at various frames per second, but in order to provide a viewer perception of a smooth flowing motion, the animation may require to play at least 60 frames per second. With too low of a resolution, the viewer can detect an undesirable, irregular, jerky motion in the computer animation sequence. Accordingly, different levels of precision in timer duration may be necessary depending on the underlying instruction(s).

SUMMARY

A method is provided for optimized timer placement. More specifically, embodiments relate to optimized placement of application timers in a computer system while accounting for timer resolution and load balancing.

In one aspect, a method is provided for optimized timer placement. A request to apply a new timer in a computer system is received. Receiving the request includes extracting an interrupt time for the new timer. A timer list is accessed for each processor in the system responsive to the received request. A range for placement of the new timer is established with respect to each of the accessed timer lists. A timer expiry delay is calculated between proximal processor interrupts and the extracted interrupt time based on the established range placement. The proximity of the extracted interrupt time within the existing processor interrupts is determined and one of the processors is selected based on the calculation and the determined proximity. The new timer is placed on the selected processor.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An interrupt is an event that alters the sequence in which the processor executes instructions. More specifically, the interrupt may be requested by a currently running program, e.g. planned, or caused by an event that might or might not be related to the currently running program, e.g. unplanned. At a defined time, the interrupt alerts the processor to a condition requiring interruption of the current program code the processor is executing. There are different categories of interrupts, including a periodic timer interrupt, a standard resolution interrupt (also referred to herein as low resolution interrupt), and high resolution interrupt. The periodic timer interrupt takes place on select intervals on a periodic basis. The high resolution timer is a mechanism for scheduling a timer event on currently available hardware with precise timed scheduling and allowing for good resolution. The standard resolution timer is less accurate than the high resolution timer.

Figure 1:
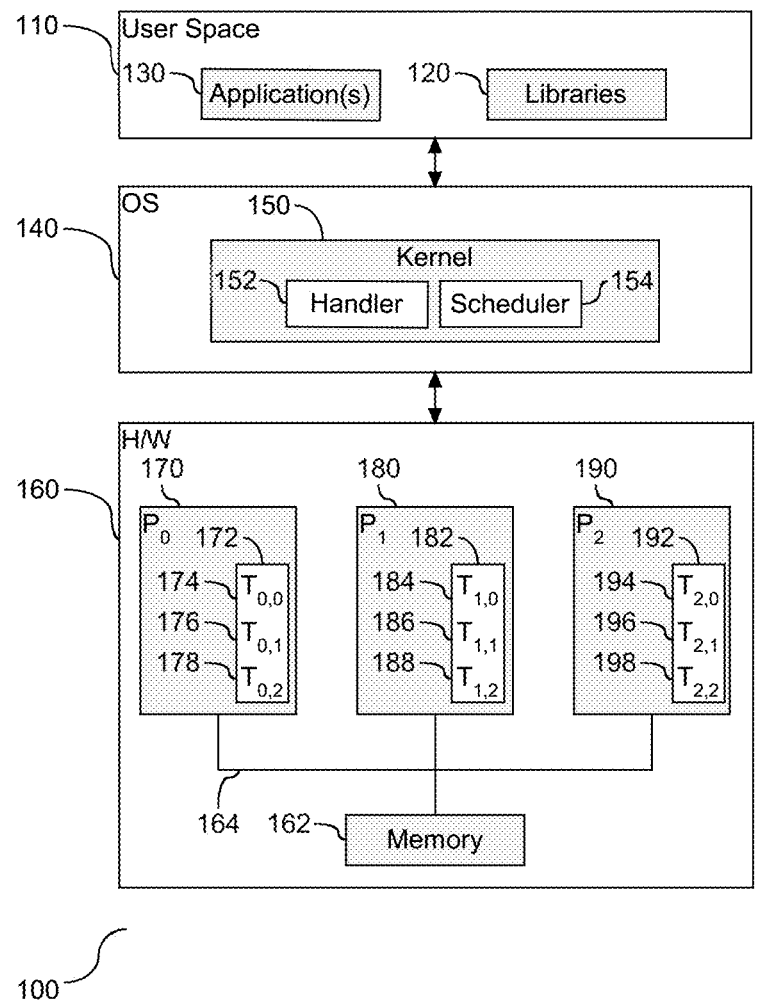
FIG. 1 depicts a block diagram illustrating a computer system that supports timer placement optimization.

Placement of a new timer requires evaluation and planning. It is desirable to keep the number of interrupts to a minimum in order to reduce overhead. As the frequency of interrupts increases, the overhead increases, i.e. the time consumed by the system to service all of the interrupts increases proportionally. At the same time, accuracy of timer placement is reflective of the event, such as a real-time event requiring the use of a high resolution timer. Referring to FIG. 1, a block diagram (100) is provided illustrating a computer system that supports timer placement optimization. As shown, there are three layers to the system including user space (110), operating system (140) and hardware (160). The user space includes a collection of user applications, such as libraries (120) and managers (130). The operating system (140) is positioned between the user space (110) and the hardware (160). The core of the operating system (140) is referred to as the kernel (150) which includes core code that manages hardware and software resources. The kernel (150) is shown herein with an interrupt handler (152) and a scheduler (154). The interrupt handler (152) manages requests for I/O operations, and the scheduler (154) determines order of processing programs. The kernel (150) may also include a manager of the address space in memory or storage. Kernel services may be requested by the operating system (140) or by application programs (112) in the user space (110). The hardware (160) executes the software of the user space (110) and the operating system (140).

As shown, the hardware layer (160) includes physical devices, including processors (170), (180), and (190), and memory (162). In one embodiment, the processor(s) may be referred to herein as processing unit(s). Each of the processors (170), (180), and (190) are in communication with the memory (162) across a bus (164). Although only three processors are shown herein, this quantity should not be considered limiting. Each processor is shown with a timer list, identifying existing processor interrupts. Processor $P_0$, (170) is shown with processor list (172), processor $P_1$, (180) is shown with processor list (182), and processor $P_2$, (190) is shown with processor list (192). Each of the processor lists is shown herein with a plurality of timers, including timers (174)-(178) in for processor $P_0$, timers (184)-(188) for processor $P_1$, and timers (194)-(198) for processor $P_2$. The quantity of timers shown herein is for illustrative purposes and should not be considered limiting.

Figure 2:
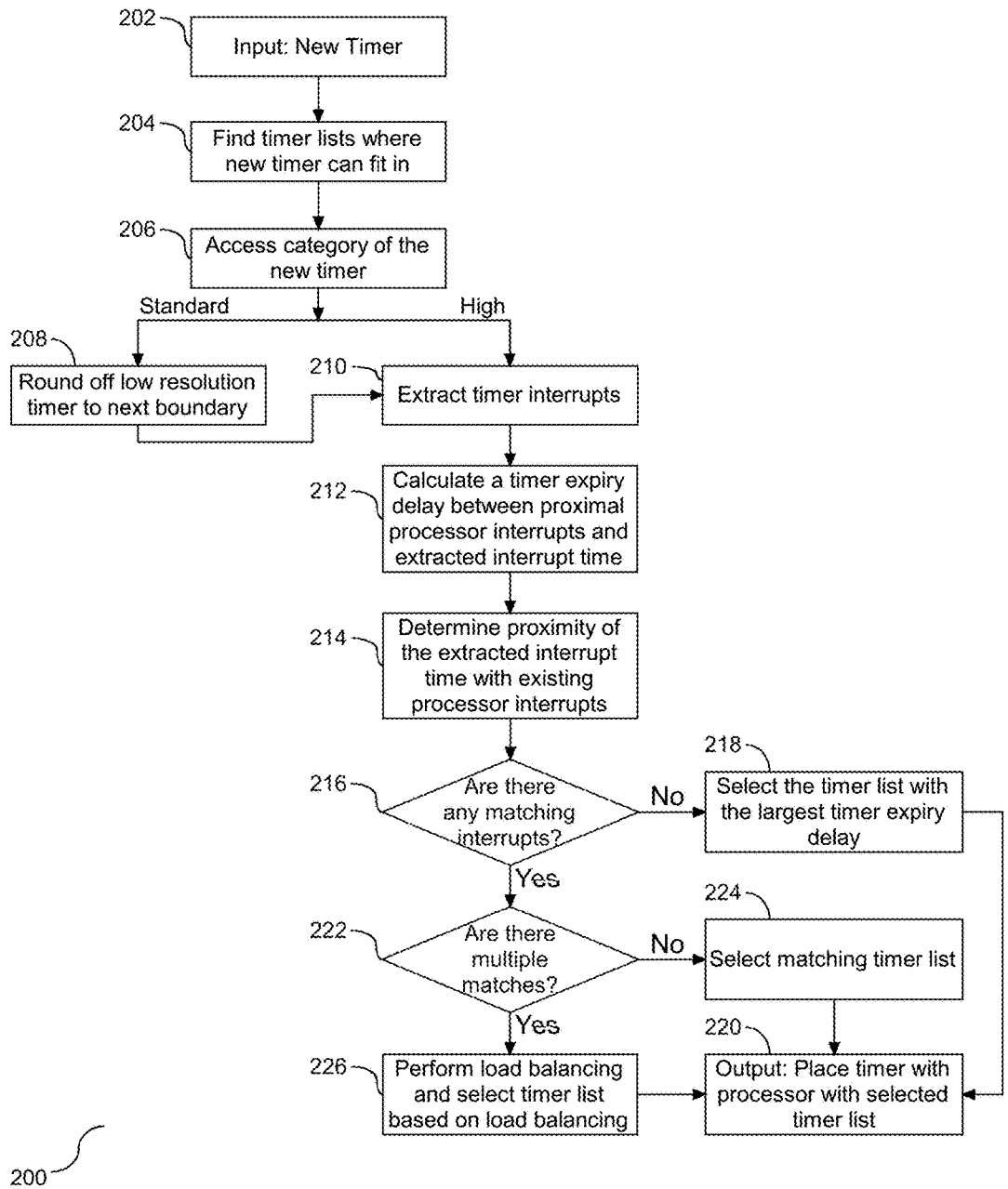
FIG. 2 depicts a flow chart illustrating a process for timer placement optimization.
Figure 3:
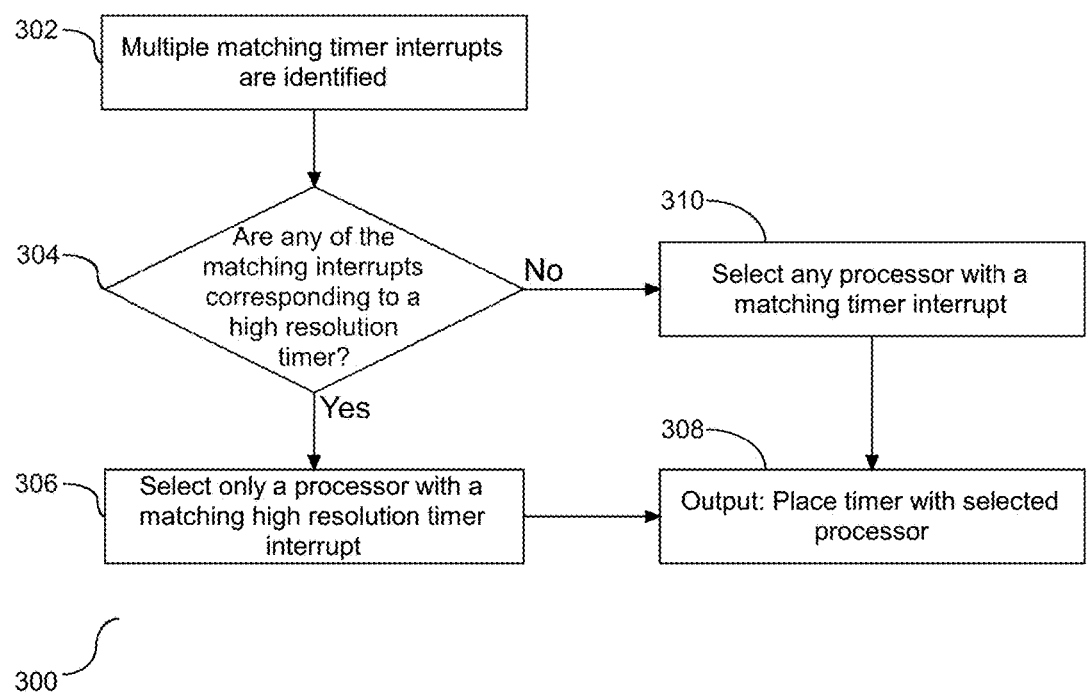
FIG. 3 depicts a flow chart illustrating a process for load balancing of timers.

The process of timer placement strategy is shown and described in FIGS. 2-3, and use case examples are shown and described in FIGS. 4-7. Timer selection includes selection of a processor, identification and selection of the timer resolution, and identification and selection of the timer interrupt time on the select processor for the selected timer and associated timer resolution. After each of these parameters has been resolved, placement of the timer on the selected processor takes place. Accordingly, the kernel (150) manages timer selection and placement.

Referring to FIG. 2, a flowchart (200) is provided illustrating a process for processing a request for application of a new timer in a computer system. It is understood that each processor in the system is configured with one or more interrupts, including periodic interrupts, and in one embodiment one or more non-periodic interrupts. As shown in FIG. 1, each processor is configured with a data structure or a list, herein after referred to as the data structure, identifying each interrupt assigned to the associated processor. Following receipt of a request for application of the new timer (202), the kernel, or in one embodiment an application in communication with the kernel, conducts a review of the data structure(s) to ascertain an appropriate or strategic time for placement of the new timer (204). There are a variety of factors employed with placement of a new interrupt on a processor. These factors include, but are not limited to, frequency of interrupts, resolution of the new interrupt, resolution of existing interrupts, and load balancing. Accordingly, prior to selection and placement of the new timer, each of these factors need to be evaluated.

The initial assessment of the request is directed at the resolution of the new timer. As described herein, the timer may be configured as the high resolution timer or the standard resolution timer. At the same time, each existing interrupt on each of the processors is defined as either high or standard resolution. In one embodiment, each periodic interrupt is categorized as a standard resolution interrupt. Following step (204), the resolution of the new timer is assessed (206). If the timer is standard resolution, the timer is rounded to the next interrupt boundary (208), which is an event that separates the time counter of the processor into periodic intervals. In one embodiment, the boundary represents a 10 millisecond interval. It is understood that the high resolution timer is not rounded to the next interrupt boundary as rounding will affect the accuracy of the timer and result in a change of resolution. Accordingly, the initial assessment is directed at the new timer, and more specifically the resolution characteristic of the new timer.

Following either step (208) for the identification of the standard timer or following step (206) for identification of the high resolution timer, the timer interrupt of the new timer is extracted and compared with the timer interrupts of the existing timers in each of the identified timer lists (210). More specifically, at step (210) two existing interrupts that are proximal to the new timer are extracted from each of the timer lists so that one of the existing interrupts is prior to the interrupt of the new timer and one of the existing interrupts is after the interrupt of the new timer. A timer expiry delay is assessed for each of the processors and their associated existing interrupt (212). The timer expiry delay is the difference between the respective proximal existing interrupts and the new timer interrupt. The assessment of the timer expiry delay is directed to determining proximity of the extracted interrupts to the existing interrupts (214). Accordingly, the timer expiry delay is performed for each proximal interrupt in each timer list.

It is understood that the timer expiry delay may return a value indicating that there is an opening for placement of the timer, or in one embodiment may not return a value, e.g. zero. If the timer expiry delay calculation is 'zero', there is a timer interrupt from at least one of the processors that exists at the same time interval, also referred to herein as a match. Following step (214), it is determined if there are any matching interrupts, e.g. no timer expiry delay, (216). If there are no matching interrupts, the processor associated with the timer list featuring the largest timer expiry delay is selected (218), and the new timer is placed with the selected processor (220). However, if at step (216) it is determined that there is at least one matching interrupt, it is then determined if there are at least two processors with interrupt that match the new timer (222). If there is only one processor with a matching interrupt, then the processor with the matching timer interrupt is selected (224) followed by a return to step (220). Placement of the timer interrupt on the selected processor includes amending the associated data structure to include the new timer interrupt. Similarly, if at step (222) multiple interrupt matches are identified, the application performs a load balancing procedure in order to determine which processor to select for placement of the new timer (226). Detail of the load balancing are shown and described in FIG. 3. Accordingly, selection of a processor includes evaluating the lists for an interrupt match, and in the event no match is found, a processor with the largest timer expiry delay is selected.

Selection of a new timer for placement requires balance. In one embodiment, there is a need to reduce frequency of interrupts on select processors to enable proper function and execution of applications. Referring to FIG. 3, a flowchart (300) is provided illustrating a procedure for load balancing timer placement when multiple matching timer interrupts are identified. As shown, two or more matching timer interrupts are identified (302). It is then determined if any of the matching interrupts correspond to a high resolution timer (304). If at least one of the matching interrupts corresponds to a high resolution timer, then the processor corresponding to the timer list with the matching high resolution timer is selected (306), and the timer is placed with the selected processor (308). However, if at step (304) it is determined that none of the matching interrupts correspond to a high resolution timer, then any one of the processors corresponding with a timer list with a matching timer interrupt may be selected (310), followed by a return to step (308). Accordingly, as demonstrated priority of timer assignment prioritizes selection of a processor with a matching high resolution timer with respect to a standard resolution timer, and prioritizes selection of a processor with a matching standard resolution timer with respect to a processor with a timer expiry delay.

Placement of a new timer for a new processor interrupt is directed by the kernel, or in one embodiment an application local to the kernel, as shown and described in FIG. 1. The processes shown and described in FIGS. 2 and 3 are directed at an optimal time placement strategy with respect to high resolution and standard resolution timers. Existing processors may be configured with a combination of interrupts, including periodic interrupts that take place at defined intervals, one or more standard resolution timers, and/or one or more high priority resolution timers. Prior to selection and placement of the new timer, the kernel evaluates all the timer lists, together with characteristics and requirements of the new timer. This evaluation entails balancing interrupts across all of the processors and either overlapping the new timer with an existing interrupt or placing the new timer sufficiently spaced apart from existing interrupts.

Figure 4:
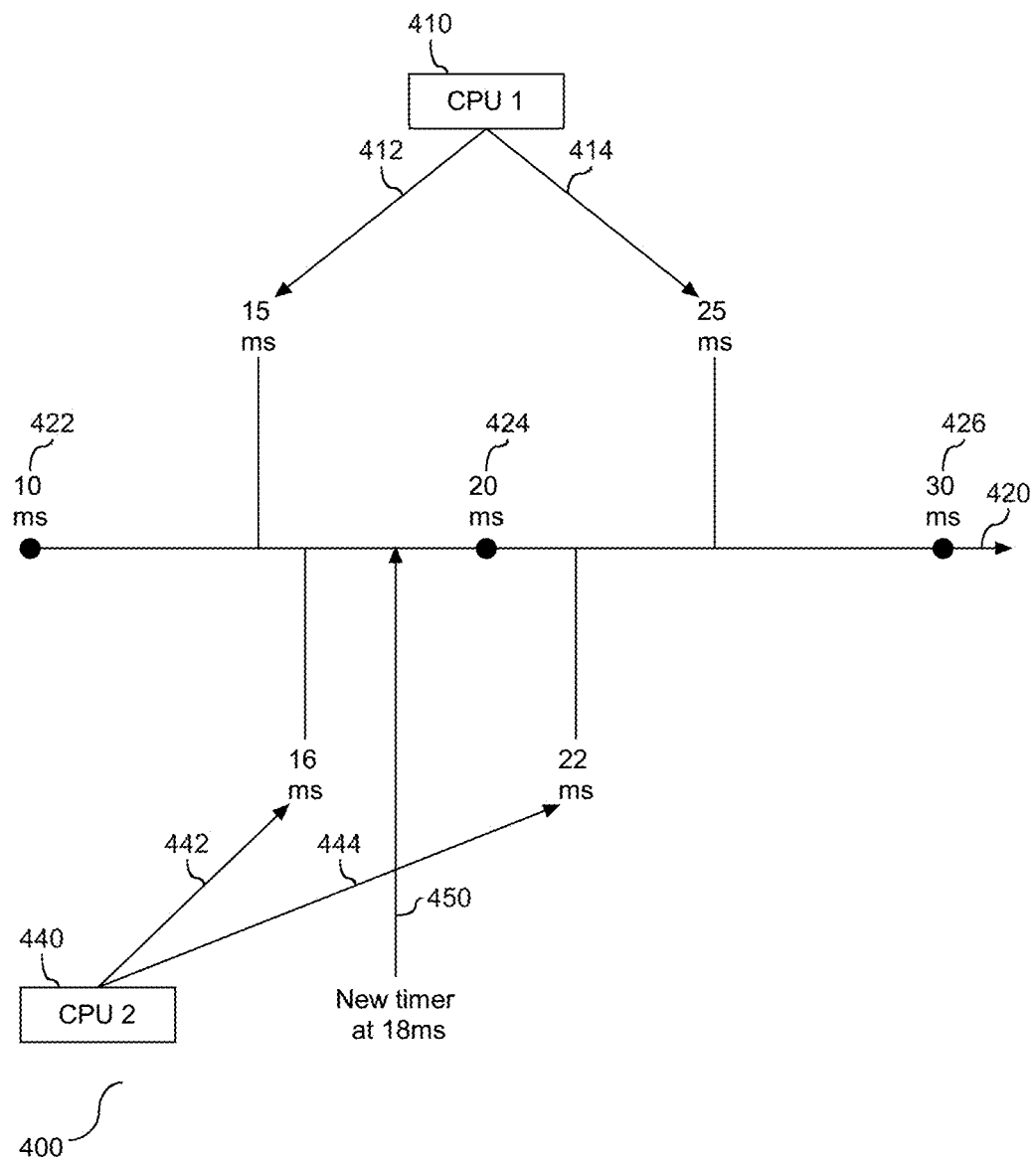
FIG. 4 depicts a block diagram illustrating a use case scenario of timer placement.

Referring to FIG. 4, a block diagram (400) is provided illustrating a use case example of timer placement. In this example, all current timer interrupts are high resolution timers. Optimal placement of the new timer is directed at preventing the high resolution timer from expiring too close to an existing timer. More specifically, the timer expiry delay between two consecutive interrupts on a processor is not a minimal value, thereby ensuring that a particular processor is not repeatedly interrupted. In this example, an application is requesting for the new timer (450) at 18 ms from current time. In this example, two processors are shown, including CPUs (410) and $CPU_2$ (440). A time line (420) is provided with multiple boundaries placed at 10 ms intervals, including 10 ms (422), 20 ms (424), and 30 ms (426). Also shown on the time line is the existing timer interrupts of the processors, $CPU_1$ (410) and $CPU_2$ (440). $CPU_1$ (420) has two timer interrupts shown at 15 ms (412) and at 25 ms (414). $CPU_2$ (440) has two timer interrupts shown at 16 ms (442) and at 22 ms (444). Timer interrupts (442) and (444) are the interrupts that are closest before and after the new timer interrupt (450), respectively. The two timer interrupts (412) and (414) are selected for calculation due to the established range for placement of the new timer with respect to the timer list for $CPU_1$ (410). The same notion applies to timer interrupts (442) and (444) with respect to the timer list of $CPU_2$ (440). In this example, the new timer is a high resolution timer and, accordingly, is not rounded to the next boundary of 20 ms (424).

The timer expiry delays are calculated. In order to assess the timer expiry delay, the absolute value is computed from either proximal interrupt for each timer list. For $CPU_1$ (410), the timer expiry delay between the new timer interrupt (450) and interrupt (412) is 18 ms-15 ms=3 ms. The timer expiry delay between interrupt (414) and the new timer interrupt (450) is 25 ms-18 ms=7 ms. A set of timer expiry delays is formed as {3, 7}, also referred to herein as the absolute difference. The same calculations are performed for the timer interrupts of $CPU_2$ (440). The timer expiry delay between the new timer interrupt (450) and interrupt (442) is 18 ms-16 ms=2 ms. The timer expiry delay between interrupt (444) and the new timer interrupt (450) is 22 ms-18 ms=4 ms. The absolute difference for $CPU_2$ (440) is thus {2, 4}. Based on the calculated set, it is determined that the value "3" is the minimum timer expiry delay in the absolute difference of $CPU_1$ (410) and the value "2" is the minimum timer expiry delay in the absolute difference of $CPU_2$ (440). A minimum set is formed from the two minimum timer expiry delay values, i.e. {3, 2}, and the maximum value of the minimum set is selected, i.e. "3". Due to the fact that the value "3" is obtained from the absolute difference of $CPU_1$ (410), $CPU_1$ is chosen as the processor for placement of the new timer. By placing the new timer (450) in $CPU_1$ (410) instead of $CPU_2$ (440), the application ensures that the new timer (450) is not placed too close to any other interrupts of timers managed by the processor(s). Accordingly, in the example (400), $CPU_1$ (410) has more time in between the two proximal interrupts (412) and (414) than $CPU_2$ (440) has between interrupts (442) and (444).

Figure 5:
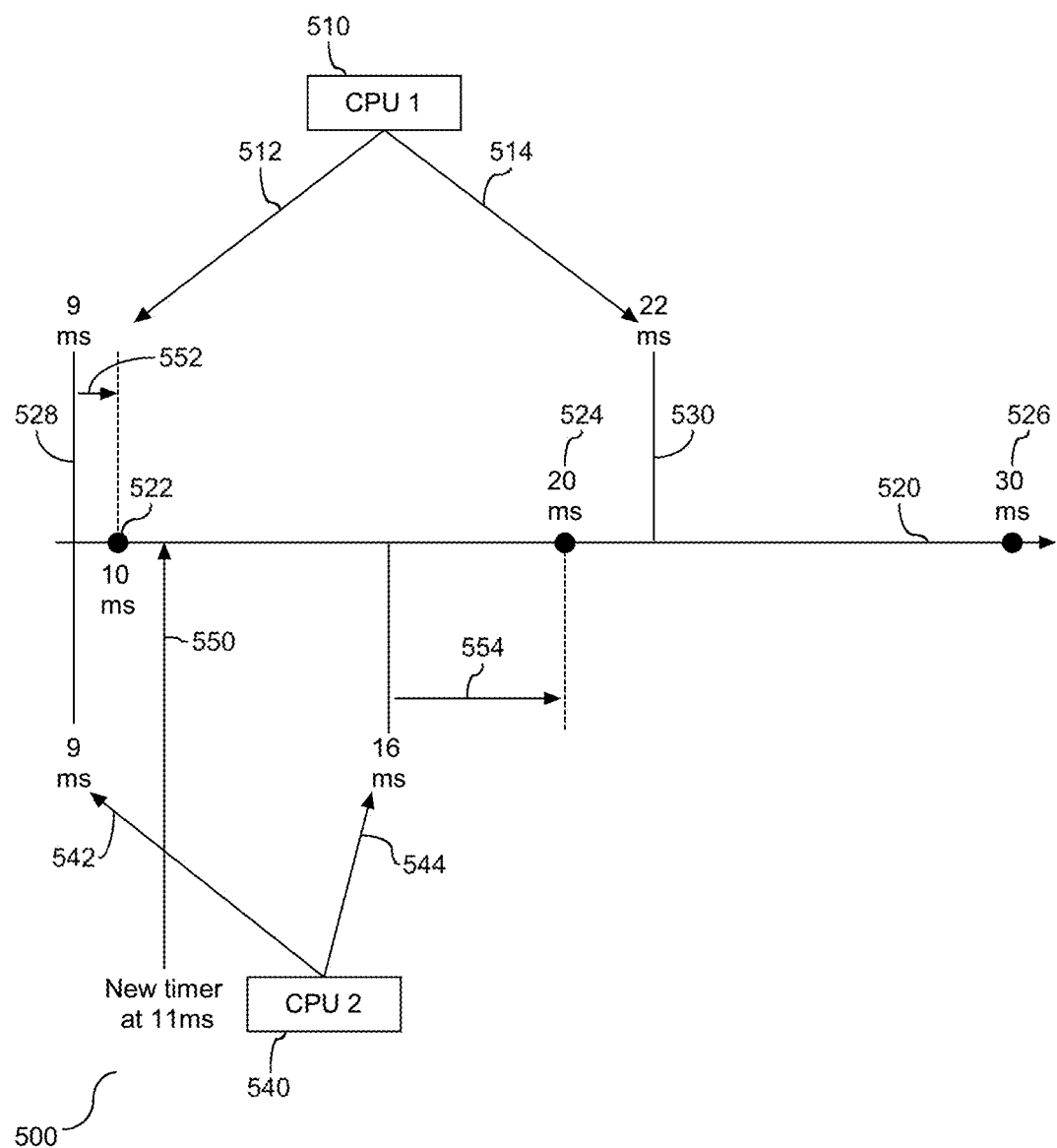
FIG. 5 depicts a block diagram illustrating another use case scenario of timer placement.

Referring to FIG. 5 a block diagram (500) is provided illustrating another a use case example of timer placement. In this example, an application is requesting for the new timer (550) at 11 ms from current time. In this example, two processors are shown, including $CPU_1$ (510) and $CPU_2$ (540). A time line (520) is provided with multiple boundaries placed at 10 ms intervals, including 10 ms (522), 20 ms (524), and 30 ms (526). Also shown on the time line (520) is the existing timer interrupts of the processors, $CPU_1$ (510) and $CPU_2$ (540). $CPU_1$ (510) has two timer interrupts, including interrupt (512) shown at 9 ms (528) and interrupt (514) shown at 22 ms (530). The timer interrupt (512) at 9 ms (522) is a standard resolution timer interrupt and as such is rounded to the next boundary (522), thus placing it the 10 ms boundary (522). $CPU_2$ (540) also has two proximal timer interrupts listed in its corresponding timer list—a high resolution timer interrupt (542) at 9 ms and a standard resolution timer interrupt (544) at 16 ms. The standard resolution timer interrupt (544) is rounded to the next boundary at 20 ms (524). The two timer interrupts (512) and (514) are selected for calculation due to the established range for placement of the new timer (550) with respect to the timer list for $CPU_1$ (510). The same notion applies to timer interrupts (542) and (544) with respect to the timer list of $CPU_2$ (540). In this example, the new timer (550) is a high resolution timer and, accordingly, is not rounded to the next boundary of 20 ms (524). However, timer interrupt (512) for $CPU_1$ (510) and timer interrupt (544) for $CPU_2$ (540) pertain to standard resolution timers. The interrupts (512) and (544) are thus rounded to the next boundary at (522) and (524), respectively.

The timer expiry delays are calculated. In order to calculate the timer expiry delay, the absolute value is computed from either proximal interrupt for each timer list. For $CPU_1$ (510), the timer expiry delay between the new timer interrupt (550) and interrupt (512) at (522) is 11 ms-10 ms=1 ms. The timer expiry delay between interrupt (544) at (524) and the new timer interrupt (550) is 22 ms-11 ms=11 ms. A set of timer expiry delays, i.e. absolute difference, for $CPU_1$ (510) is formed as {1, 11}. The same calculations are performed for the timer interrupts of $CPU_2$ (550). The timer expiry delay between the new timer interrupt (550) and interrupt (542) is 11 ms-9 ms=2 ms. The timer expiry delay between interrupt (544) and (524) and the new timer interrupt (550) is 20 ms-11 ms=9 ms. The absolute difference for $CPU_2$ (540) is thus {2, 9}. Based on the calculated set, it is determined that the value "1" is the minimum timer expiry delay in the absolute difference of $CPU_1$ (510) and the value "2" is the minimum timer expiry delay in the absolute difference of $CPU_2$ (540). A minimum set is formed from the two minimum timer expiry delay values, i.e. {1, 2}, and the maximum value of the minimum set is selected, i.e. "2". Due to the fact that the value "2" is obtained from the absolute difference of $CPU_2$ (540), $CPU_2$ (540) is selected as the processor for placement the new timer (550). By placing the new timer in $CPU_2$ (540) instead of $CPU_1$ (510), the application ensures that the new timer (550) is not placed too close to any other interrupts of timers managed by the processor(s). Accordingly, in the example (500), $CPU_2$ (540) has more time in between the two proximal interrupts (542) and (544) than $CPU_1$ (510) has between interrupts (512) and (514).

Figure 6:
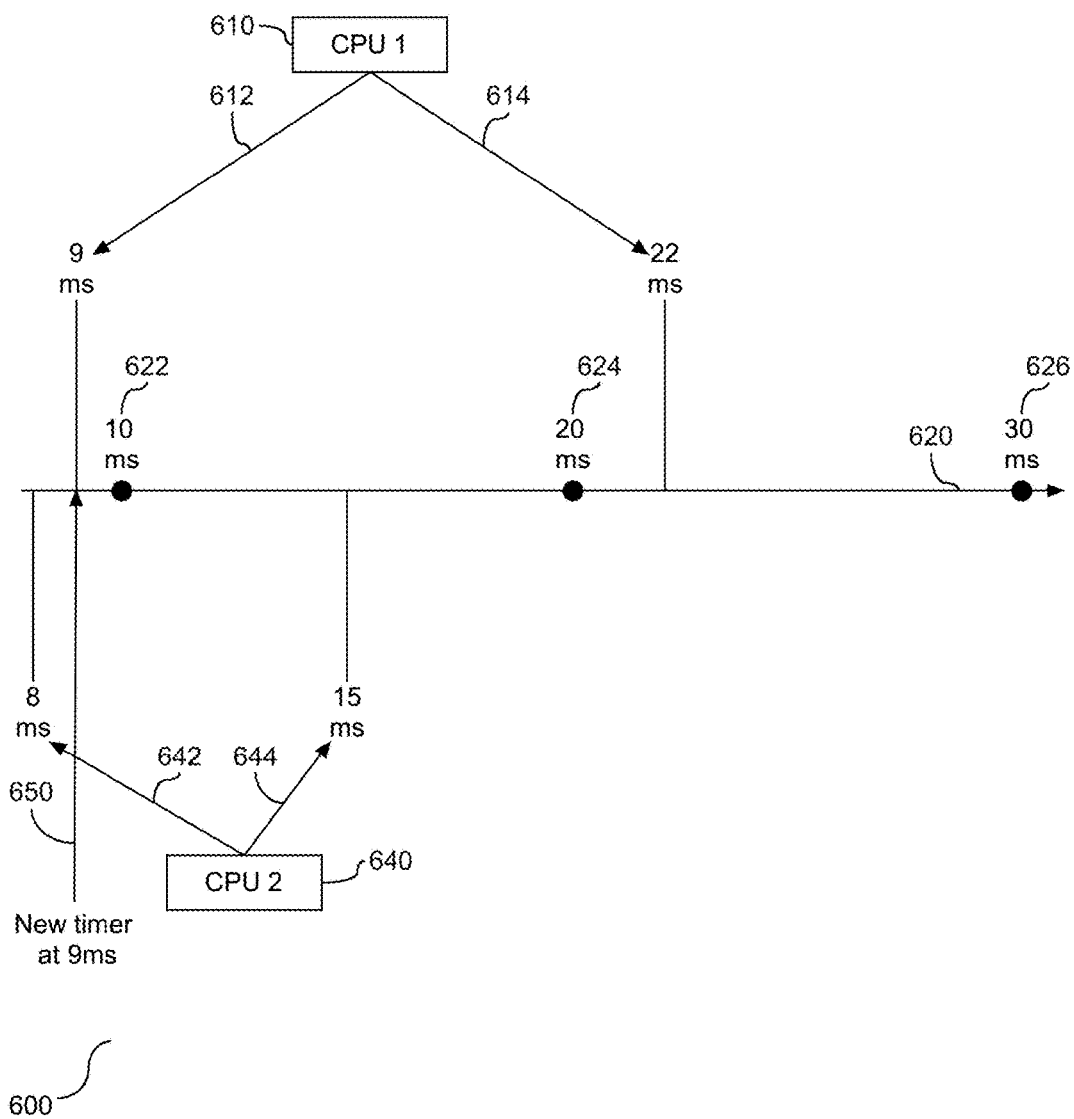
FIG. 6 depicts a block diagram illustrating another use case scenario of timer placement.

Referring to FIG. 6, a block diagram (600) is provided illustrating another a use case example of timer placement. In this example, an application is requesting for the new timer (650) at 9 ms from the current time. A time line (620) is provided with multiple boundaries placed at 10 ms intervals, including 10 ms (622), 20 ms (624), and 30 ms (626). Also shown on the time line (620) is the existing timer interrupts of the processors, $CPU_1$ (610) and $CPU_2$ (640). $CPU_1$ (610) has two timer interrupts (612) and (624), shown at 9 ms and at 22 ms, respectively. Both timer interrupts (612) and (614) are high resolution timer interrupts. $CPU_2$ (640) also has two timer interrupts (642) and (644), shown at 8 ms and at 15 ms, respectively. The two timer interrupts (612) and (614) are selected for calculation due to the established range for placement of the new timer with respect to the timer list for $CPU_1$ (610). The same notion applies to timer interrupts (642) and (644) with respect to the timer list of $CPU_2$ (640). In this example, the new timer is a high resolution timer and, accordingly, is not rounded to the next boundary, shown in this example at 10 ms (622).

The timer expiry delay is calculated. In order to calculate the timer expiry delay, the absolute value is computed from the either proximal interrupt for each timer list. For $CPU_1$ (610), the timer expiry delay between the new timer interrupt (650) and interrupt (612) is 9 ms-9 ms=0 ms. The timer expiry delay between interrupt (614) and the new timer interrupt (650) is 22 ms-9 ms=15 ms. An absolute difference for $CPU_1$ (610) is formed as {0, 15}. The same calculations are performed for the timer interrupts of $CPU_2$ (640). The timer expiry delay between the new timer interrupt (650) and interrupt (642) is 9 ms-8 ms=1 ms. The timer expiry delay between interrupt (644) and the new timer interrupt (650) is 15 ms-9 ms=6 ms. The absolute difference for $CPU_2$ (640) is thus {1, 6}. Based on the calculated set, it is determined that the value "0" results in a match within the absolute difference of $CPU_1$ (610). It is determined that there are no other matches other than the timer expiry of interrupt (612) in the timer list of $CPU_1$ (610). Due to the fact that the match is obtained from the absolute difference of $CPU_1$ (610), $CPU_1$ is chosen as the processor for placement of the new timer. By placing the new timer in $CPU_1$ (610) instead of $CPU_2$ (640), the application ensures timer placement optimization by utilizing an interrupt time that is already assigned to another timer.

Figure 7:
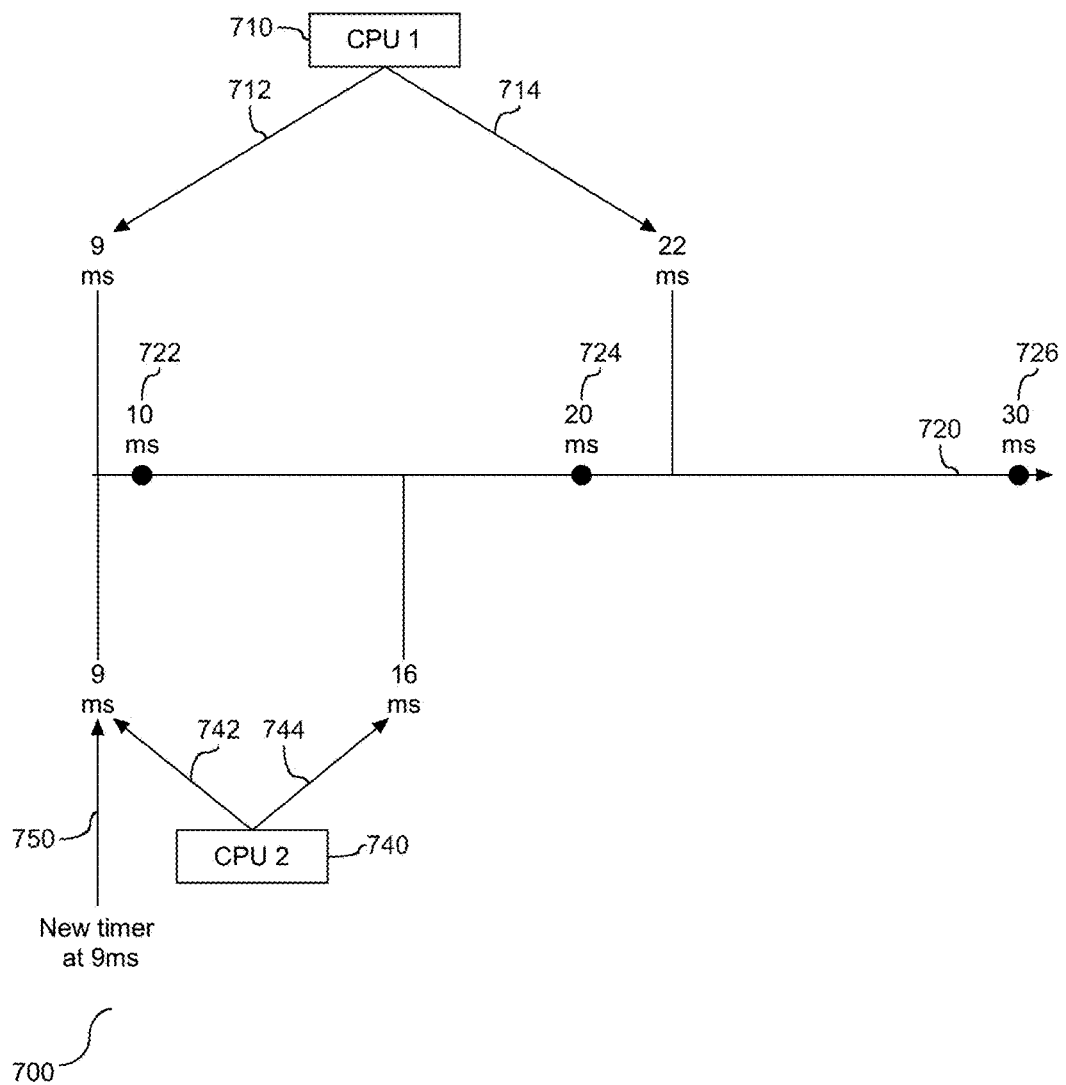
FIG. 7 depicts a block diagram illustrating another use case scenario of timer placement.

Referring to FIG. 7, a block diagram (700) is provided illustrating yet another user case example of timer placement. In this example, an application is requesting for the new timer (750) at 9 ms from the current time. A time line (720) is provided with multiple boundaries placed at 10 millisecond intervals, including 10 ms (722), 20 ms (724), and 30 ms (726). Time line (720) also illustrates existing timer interrupts of the processors, $CPU_1$ (710) and $CPU_2$ (740). $CPU_1$ (710) has two timer interrupts (712) and (714), shown at 9 ms and 22 ms, respectively. Interrupt (712) is a standard resolution timer and interrupt (722) is a high resolution timer. $CPU_2$ (740) also has two timer interrupts (742) and (744), shown at 9 ms and 16 ms, respectively. Both timer interrupts (742) and (744) are high resolution timer interrupts. Since the new timer (750) co-incides with two timers, one high resolution and one standard resolution, $CPU_2$ (740) with the matching high resolution timer is selected for placement of the new timer (750).

Upon determining that there are multiple matches from the absolute difference calculations, the application performs a load balancing between the two matching timer lists in order to select the optimal processor to place the timer. For load balancing, the application determines whether any of the matching interrupts pertain to a high resolution timer. In the example (700), the timer interrupt (712) for $CPU_1$ (710) is a standard resolution interrupt, while the timer interrupt (742) for $CPU_2$ (740) is a high resolution interrupt. Precedence is given to high resolution interrupts, if any, for placement of the new timer. Accordingly, the timer is placed with $CPU_2$ (740) at the matching timer interrupt (742), since timer (742) is the only high resolution timer interrupt to match with the new timer (750).

The present embodiments shown and described herein may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Timer placement optimization automatically optimizes the selection of a functioning processor for placement of a timer, as requested by a running application. The embodiments recited in this application function to decrease the amount of interrupts handled by each processor, ensures that sequential interrupts are optimally spaced, and that the processing load placed on a set of processors is evenly distributed. Accordingly, computer system functioning is enhanced by the optimized placement of timers across a set of processors.

It will be appreciated that, although specific embodiments have been described herein for purposes of illustration, various modifications may be made without departing from the spirit and scope of the embodiments. In particular, the quantity of processors and corresponding processor lists should not be considered limiting. Each processor in the system may be a single-core or multi-core processor. In one embodiment, the application and the operating system may be stored on different servers or client machines. Accordingly, the scope of protection of these embodiments is limited only by the following claims and their equivalents.

What is claimed is:

1. A method comprising:
   receiving a request to apply a new timer in a computer system, including extracting an interrupt time for the new timer;
   accessing a timer list for each processor in the system responsive to the received request, wherein each timer list indicates existing processor interrupts;
   establishing a range for placement of the new timer with respect to each of the accessed timer lists;
   calculating a timer expiry delay between proximal processor interrupts and the extracted interrupt time based on the established range placement;
   determining proximity of the extracted interrupt time within the existing processor interrupts;
   selecting one of the processors based on the calculation and the determined proximity; and
   placing the new timer on the selected processor.

2. The method of claim 1, wherein calculating the timer expiry delay comprises:
   selecting a set of proximal existing interrupt times for each timer list;
   calculating an absolute difference between each existing timer interrupt time of the selected set of proximal existing interrupt time and the extracted interrupt time; and
   comparing the absolute difference of each set of proximal existing interrupt times, wherein the processor selection is responsive to the comparison.

3. The method of claim 2, further comprising detecting a resolution of the new timer, and responsive to detection of a standard resolution, rounding the new timer to a next processor boundary on the each processor in the system, calculating the absolute difference with respect to the processor boundary, and selecting the processor with a largest calculated absolute difference.

4. The method of claim 2, wherein the absolute difference calculation returns at least one timer list with an existing interrupt matching the new timer interrupt time, and further comprising selecting the processor with the matching interrupt time.

5. The method of claim 2, wherein the absolute difference calculation returns at least two timer lists each with an existing timer having a matching interrupt and at least one of the matching interrupts is a high resolution timer, and further comprising selecting the processor with the matching high resolution timer.

6. The method of claim 2, further comprising detecting a resolution of the new timer, and responsive to detection of a high resolution and the absolute difference calculation returns a non-matching interrupt, selecting the processor with a largest calculated absolute difference.

7. The method of claim 1, further comprising balancing placement of the new timer with respect to the existing processor interrupts in the system, wherein the balancing includes accounting for distribution of periodic and non-periodic timer events and mitigating frequent interrupts.

* * * * *